United States Patent

Kobayashi et al.

[15] 3,676,748

[45] July 11, 1972

[54] FRAME STRUCTURES FOR ELECTRONIC CIRCUITS

[72] Inventors: Seihin Kobayashi; Michihiro Torii, both of Shizuoka, Japan

[73] Assignee: Fuji Denki Kagaku Kabushiki Kaisha, Tokyo, Japan

[22] Filed: March 30, 1971

[21] Appl. No.: 129,356

[30] Foreign Application Priority Data

April 1, 1970 Japan....................................45/31218

[52] U.S. Cl. ....................................317/101 CM, 317/101 D

[51] Int. Cl. ..........................................................H05k 1/04

[58] Field of Search....................317/101 A, 101 D, 101 CC; 174/52 S, DIG. 3

[56] References Cited

UNITED STATES PATENTS

| | | | |
|---|---|---|---|
| 3,118,016 | 1/1964 | Stephenson, Jr. | 317/101 A |
| 3,436,606 | 4/1969 | Reed | 317/101 CC |
| 2,999,964 | 9/1961 | Glickman | 170/DIG. 3 |
| 3,537,175 | 11/1970 | St. Clair et al. | 174/52 S |
| 3,404,319 | 10/1968 | Tsusi et al. | 174/52 S |

FOREIGN PATENTS OR APPLICATIONS

| | | | |
|---|---|---|---|
| 1,117,164 | 11/1961 | Germany | 317/101 D |

*Primary Examiner*—David Smith, Jr.
*Attorney*—Eliot S. Gerber

[57] ABSTRACT

A frame for electronic circuits is provided which comprises a plurality of terminal groups in a laminated relation, each of said terminal groups having a number of terminal metal members arranged substantially on the same plane, and a plurality of insulated frame members sandwiching said terminal groups, each of said terminal metal members being connected at its inner end to an associated conductive wire of the electronic circuit and projected at its outer end to the outside of said frame members.

9 Claims, 7 Drawing Figures

INVENTORS
SEIHIN KOBAYASHI
MICHIHIRO TORII
BY Eliot S. Gerber
ATTORNEY

INVENTORS
SEIHIN KOBAYASHI
MICHIHIRO TORII
BY Eliot S. Gerber
ATTORNEY

INVENTORS
SEIHIN KOBAYASHI
MICHIHIRO TORII

BY Eliot S. Gerber
ATTORNEY

FRAME STRUCTURES FOR ELECTRONIC CIRCUITS

This invention relates to frame structures for electronic circuits and more particularly to frame structures for a high capacity of memory elements such as memory cores and wire memories, switching elements such as transistors, diodes, switching cores and transformers, control elements such as multi-aperture cores and SCR, or logical elements such as integrated circuits.

One of the frame structures of the kind widely used, a printed circuit board, requires an etching technique. But, in such a printed circuit board, it requires a high technique and is difficult to assemble a great number of memory elements therein. In addition, as the etching technique is effected on the printed circuit board, a corrosive material may remain in the board with the result that it has an adverse effect upon reliability; for example, the corrosive may cause the breaking down of wires after the forming of the final products.

In another frame structure in which the etching corrosive is not used, is a flat package adapted to integrated circuits. In this structure, high reliability can be accomplished since metal terminals are embedded within a glass package. But, for a frame structure of a larger capacity, it will become expensive and will not be acceptable in practice.

Accordingly, an object of the present invention is to provide an improved frame structure for electronic circuits, which frame structure has a high reliability and large capacity but is able to be produced at low cost.

According to the present invention, a frame for an electronic circuit comprises a plurality of terminal groups in a laminated relation, each of said terminal groups having a number of terminal metal members arranged substantially on the same plane, and a plurality of insulated frame members sandwiching said terminal groups, each of said terminal metal members being connected at its inner end to an associated conductive wire of the electronic circuit and projected at its outer end to the outside of said frame members.

In the preferred frame structure of the present invention, one terminal group is shifted in the horizontal direction with respect to other vertically adjacent terminal group or groups so that each terminal metal member of the one terminal group may be located above but between the terminal metal members of the other terminal group. The terminal metal members of each terminal group are punched from a metal sheet with narrow spaced allowed in the punching process. By such assembly, it becomes possible to provide a frame of larger capacity and higher density of elements of the electric circuit. In addition, as the frame is assembled without using any corrosive material, any breaking down of wires due to the corrosive may be eliminated, thereby improving the reliability of the electronic circuit.

Moreover, in the preferred frame structure, as each of the terminal groups is arranged on the different stepped planes, the soldering operation to connect each terminal metal member to the associated conductive wire in the electronic circuit can easily and correctly be made, even though the spaces between the terminal metal members are very narrow.

Furthermore, as the outer end of each terminal metal member is extended beyond the frame member, compared with the conventional printed circuit frame in which strap wires are employed to connect them to a peripheral circuit, the present frame does not require such strap wires and remarkably reduces the solder operation soldering the frame to the peripheral circuit.

In order to make it easier to understand the other objectives and features of the present invention, a detailed explanation shall be made hereinafter with reference to the accompanying drawings, in which.

Figure 1:
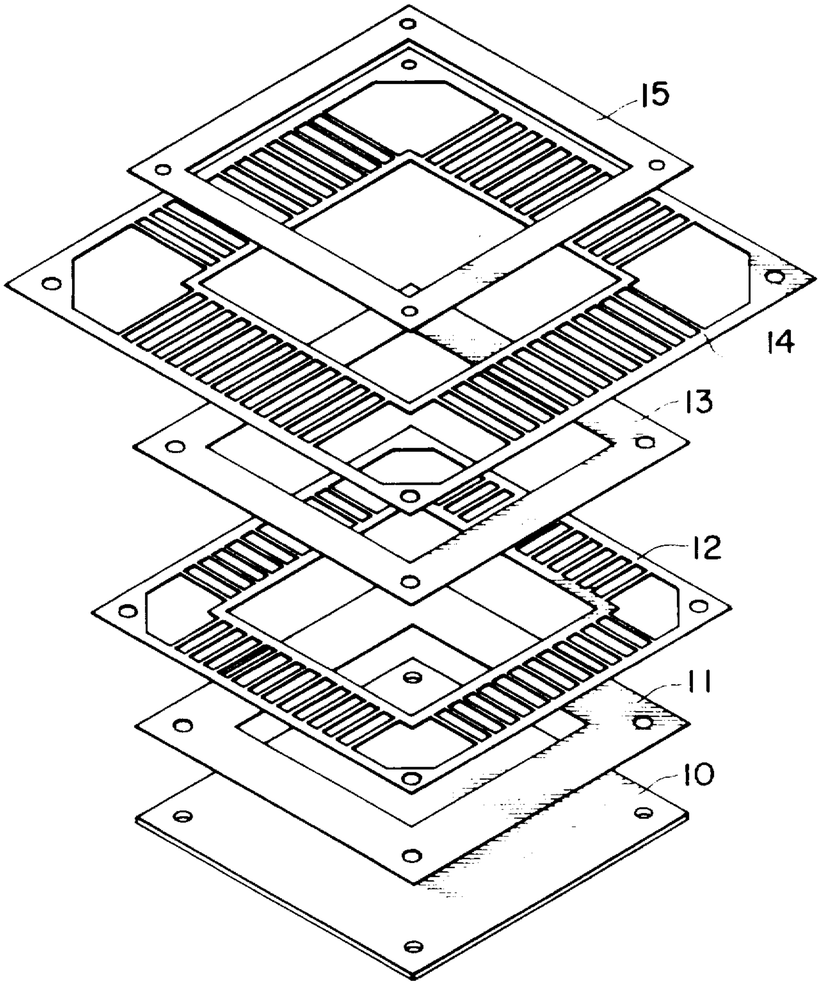
FIG. 1 is a perspective view showing a frame structure according to the first embodiment of the present invention prior to its assembly.

Referring to the first embodiment shown in FIGS. 1 to 4, reference numeral 10 designates a sheet of flat frame base. The frame base 10 may be a glass epoxy plate made of organic synthetic material or, in consideration of the electrical noise screening effect or the excellent heat conductivity, a copper sheet plated with gold may be employed. Laminated upon the frame base 10 are insulated frames 11, 13 and 15 having small, medium and large openings, respectively. Preferably, the insulated frames are made of glass epoxy boards. Sandwiched between the insulated frames are two terminal groups 12 and 14 which are preferably punched from phosphor bronze plates as shown in FIG. 1 and plated with gold. The inner and the outer frame portions of the two terminal groups 12 and 14 are cut off after they are assembled into a monolithic frame, thereby separating and insulating a number of terminal metal members from each other.

In assembly, after laminating the insulated frame members 11, 13 and 15 and the terminal groups 12 and 14 above the frame base 10 as shown in FIG. 1, they are combined into a monolithic frame. Thin adhesive layers (not shown) of semi-polymerized glass epoxy, generally called "Prepreg," are provided at each intermediate portion between the base 10, insulated frames 11, 13 and 15 and terminal groups 12 and 14, and the assembly is subjected to heat and pressure in a press for about 30 minutes to form the laminated frame. Then, the inner and the outer frame portions of the terminal groups 12 and 14 are cut off, and conductive wires in electronic circuit 1 are connected to the associated terminal metal members as shown in FIG. 2.

Figure 2:
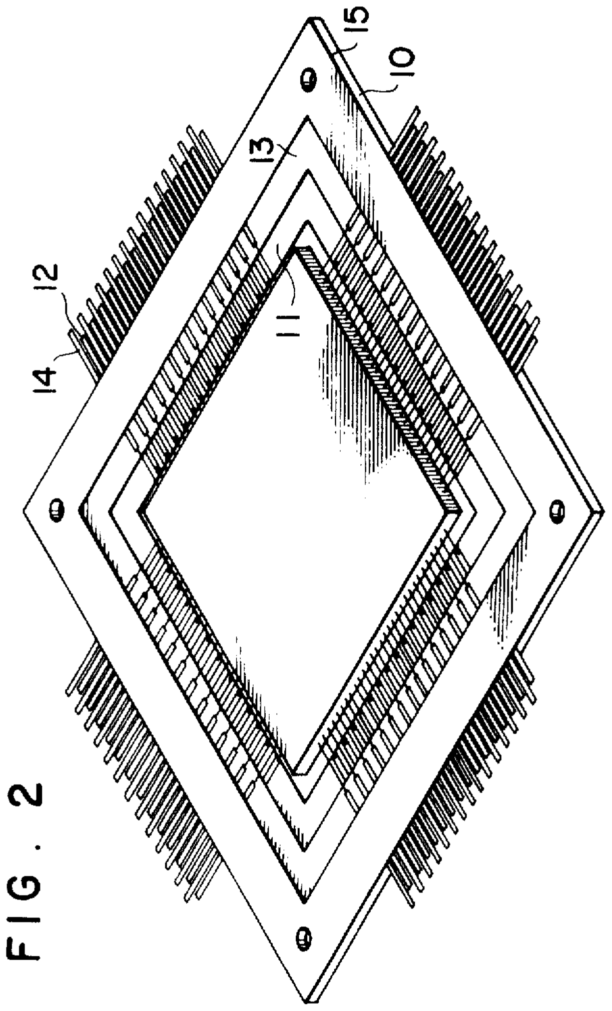
FIG. 2 is a perspective view of the same assembled as a product in which electronic circuits are connected to associated terminal metal members.
Figure 3:
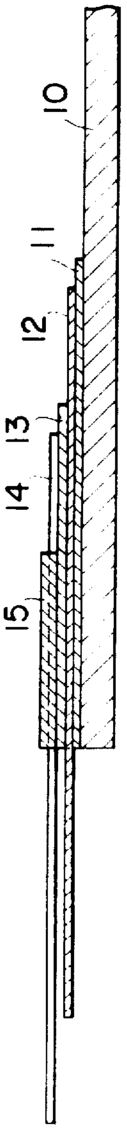
FIG. 3 is a vertically sectioned fragmentary view of the same showing in detail the terminal metal members.

In the preferred frame structure of the present invention, as shown in FIGS. 2 and 3, the terminal metal members 12 and 14 laminated are laterally shifted with each other so that the upper terminal metal members may be located above but between the lower terminal metal members and so that the inner ends of the terminal metal members, which are to be connected to the electronic circuit 1, may be located on the different stepped planes.

Figure 4:
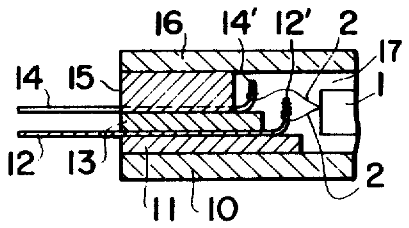
FIG. 4 is a vertically sectioned fragmentary view of the frame according to the second embodiment of the present invention in which the electronic circuit is sealed within the frame.

In the second embodiment shown in FIG. 4, in order to seal the electronic circuit 1 within the frame from the atmosphere, a flat plate 16 made of similar material as the frame base 10 covers the opening of the uppermost insulated frame member 15. Within a space 17 covered by the flat plate 16, anti-oxidation gas may be filled so as to prevent the electronic circuit and the connecting portions of the terminal metal members from oxidizing, or, alternatively, heat conductive material such as silicone grease may be filled therein so as to radiate the heat generated from the electronic circuit 1 to the outside of the frame and to prevent the conductive wires connecting the electronic circuit to the frame from being broken down due to mechanical shock of the electronic circuit.

In the embodiment shown in FIG. 4, the inner end portions 12' and 14' of the terminal metal members 12 and 14 are folded upwardly, to which portions the conductive wires from the electronic circuit 1 are wrapped and firmly connected or soldered.

Figure 5:
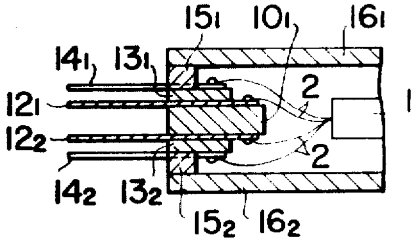
FIG. 5 is a vertically sectioned fragmentary view of the frame according to the third embodiment of the present invention.

The descriptions of the present invention have been made above with reference to the embodiments in which the insulated frame members and the terminal metal members are laminated and combined to be monolithic in one side of the frame base 10. However, the present invention is not limited to such structures. As shown in FIG. 5, the frame members 13, 13, 15 and 15 and the terminal metal members 12, 12, $14_1$ and $14_2$ are laminated on both sides of the frame base $10_1$ and combined to be monolithic in such a manner that the terminal metal members sandwich the frame base $10_1$. In this embodiment, the frame base $10_1$ has an opening in which the electronic circuit is disposed. Likewise, the first and second embodiments, the upper and the lower terminal groups are disposed on the different stepped planes and shifted so that each terminal metal member of one terminal group $14_1$ or $14_2$ is located between the terminal metal members of the other terminal group $12_1$ or $12_2$. The frame is covered on both sides thereof with flat plates $16_1$ and $16_2$.

Figure 6:
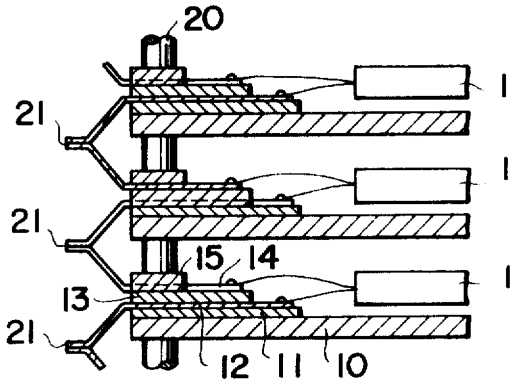
FIG. 6 is a vertically sectioned fragmentary view of the frames assembled in stack.

We now refer to the modes of connecting the outer ends of the terminal metal members of the frame. In an example shown in FIG. 6, a plurality of frames are vertically stacked with fixed spaces by means of stack bars 20. After stacking, the outer ends of the upper and lower terminal metal members are connected at portions 21 to those of the lower terminal metal members of the upper frame and to those of the upper terminal metal members of the lower frame. Compared with the conventional connecting modes in which each two frames have been connected by soldering two portions of the strap wire, the frames according to this embodiment can be connected with each other by one soldering operation. Furthermore, by using a dip soldering mode, all the connecting portions of the terminal metal members outside the stacked frame members can be soldered by a single operation.

Figure 7:
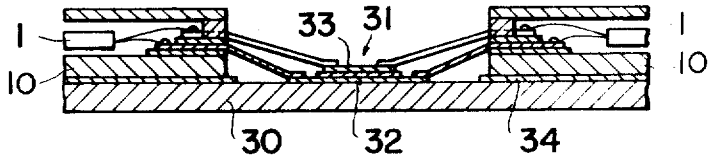
FIG. 7 is a vertically sectioned fragmentary view of the frames assembled on the horizontal plane.

FIG. 7 shows another mode of connecting the terminal metal members in which the frames arranged substantially on the same horizontal plane are connected with each other by means of a supplemental plate 31 placed on a main base plate 30. The supplemental plate 31 has a terminal plate 33 superposed upon another terminal plate 32 with an insulated plate interposed therebetween. Each terminal member of the both adjacent frames are connected by soldering to the associated terminal plates 32 and 33. In FIG. 7, a metal plate 34 is provided between the frame base 10 and the main base plate 30. The metal plate 34 serves as an earth plate or a heat radiating plate.

Although the present invention has been described with reference to the preferred embodiments shown in the drawings, many modifications and alternations may be made within the spirit of the present invention.

We claim:

1. An assembly of a plurality of frames arranged substantially on a horizontal plane, each of said frames comprising a frame base, an upper terminal group and a lower terminal group in a laminated relation on said frame base, each of said terminal groups having a number of terminal metal members arranged substantially on the same plane, and a plurality of insulated frame members sandwiching said terminal groups, each of said terminal metal members being connected at its inner end to an associated conductive wire of an electronic circuit and projected at its outer end to the outside of said frame members, wherein a base plate has placed thereon at least two frames and a plurality of supplemental terminal plates, said supplemental terminal plates being laminated with each other with an insulated plate interposed therebetween and being connected respectively to metal members of said upper and lower terminal groups.

2. An assembly as claimed in claim 1, wherein a metal plate is provided between said base plate and said frame base.

3. A laminated frame for an electronic circuit comprising a plurality of terminal groups, each of said terminal groups having a plurality of separate terminal metal members arranged substantially on the same plane, each of said terminal members being a flat metal strip, and a plurality of insulative frame members sandwiching said terminal groups, each of said terminal metal members being connected at its inner end to an associated conductive wire of the electronic circuit and projected at its outer end beyond the outside of said frame member, wherein the terminal group on one plane is shifted in the horizontal direction with respect to another terminal group on another vertically adjacent plane, wherein each terminal metal member on said one plane is located above but between the terminal metal members on said other plane.

4. A frame for an electronic circuit as claimed in claim 3 further comprising a plurality of adhesive layers adhering said each terminal group to the adjacent insulated frame members.

5. A frame for an electronic circuit as claimed in claim 3, wherein each of said terminal groups is arranged on different stepped planes.

6. A frame for an electronic circuit as claimed in claim 3, wherein an upper opening and a lower opening of said laminated frame members are sealed by flat plates forming a sealed space.

7. A frame for an electronic circuit as claimed in claim 5, wherein said stepped planes are formed on both sides of a frame base.

8. A frame for an electronic circuit as claimed in claim 6, wherein an anti-oxidation gas is filled within said sealed space.

9. A frame for an electronic circuit as claimed in claim 6, wherein a heat conductive material is filled within the sealed space.

* * * * *